(12) United States Patent
Brown et al.

(10) Patent No.: US 6,983,683 B2
(45) Date of Patent: Jan. 10, 2006

(54) CONFECTIONERY AERATION SYSTEM

(75) Inventors: Peter Arthur Brown, Chesterfield (GB); Anthony John Prange, Peterborough (GB); Roger David Coulthard, Peterborough (GB)

(73) Assignee: APV Systems Limited, Petersborough (GB)

( * ) Notice: Subject to any disclaimer, the term of this patent is extended or adjusted under 35 U.S.C. 154(b) by 404 days.

(21) Appl. No.: 10/122,895

(22) Filed: Apr. 15, 2002

(65) Prior Publication Data

US 2002/0176917 A1  Nov. 28, 2002

Related U.S. Application Data

(63) Continuation-in-part of application No. PCT/GB00/04008, filed on Oct. 19, 2000.

(30) Foreign Application Priority Data

Oct. 22, 1999 (GB) .................................. 9924927
Jul. 13, 2000 (GB) ..................................... 17166

(51) Int. Cl.
 *A23L 2/54* (2006.01)
(52) U.S. Cl. ........................ 99/323.1; 99/474
(58) Field of Classification Search ............. 426/474, 426/660; 99/323.1, 474
See application file for complete search history.

(56) References Cited

U.S. PATENT DOCUMENTS

| 2,883,286 A | 4/1959 | Musser |
| 3,508,932 A | 4/1970 | Pilz |
| 3,958,018 A | 5/1976 | Tay |
| 4,032,667 A | 6/1977 | Kreuter |
| 4,081,559 A | 3/1978 | Jeffery et al. |
| 4,418,089 A | 11/1983 | Bouette |
| 4,499,113 A | 2/1985 | Mochizuki et al. |
| 4,661,366 A | 4/1987 | Pinto et al. |
| 5,017,390 A * | 5/1991 | Sawant ........................ 426/100 |
| 5,370,888 A | 12/1994 | Hachiya et al. |

FOREIGN PATENT DOCUMENTS

| CH | 0680411 | 8/1992 |
| DE | 2653018 | 5/1978 |

(Continued)

*Primary Examiner*—Anthony Weier
(74) *Attorney, Agent, or Firm*—John P. White, Esq.; Cooper & Dunham LLP

(57) ABSTRACT

A confectionery aeration system comprising a confectionery material re-circulation circuit (7), the circuit comprising an aerator (12) and a confectionery vessel (2), the confectionery material re-circulation circuit being arranged such that a re-circulation outlet (8) of the vessel is connected to an inlet (9) of the vessel, the re-circulation circuit being without any de-aeration means for producing any substantial de-aeration material in the flow path between the re-circulation outlet and the aerator, the aerator being arranged in the re-circulation circuit to further aerate aerated confectionery material flowing from the re-circulation outlet of the vessel to the vessel inlet, the vessel inlet being provided with a back-pressure producing device (10) arranged so as to maintain a super-atmospheric pressure in the confectionery material in that part of the re-circulation circuit between the aerator and the vessel inlet, the circuit being provided with a supply connection (14) for feeding fresh confectionery material into the re-circulation circuit, and a supply of aerated confectionery material for feeding to a confectionery producing process being taken from at least one of a first feed outlet (3) located in a lower part of the vessel and a second feed outlet (17, 31) which receives material which is conveyed from the aerator to the inlet of the vessel.

10 Claims, 3 Drawing Sheets

FOREIGN PATENT DOCUMENTS

| | | |
|---|---|---|
| DE | 4203086 | 5/1993 |
| DE | 4214581 | 7/1993 |
| EP | 0322952 | 7/1989 |
| EP | 0322952 A2 | 7/1989 |
| EP | 0502360 A1 | 9/1992 |
| EP | 0724836 A2 | 8/1996 |
| EP | 0919133 | 6/1999 |
| FR | 2508280 | 12/1982 |
| GB | 1297579 | 11/1972 |
| GB | 2070197 | 9/1981 |
| GB | 2217174 | 10/1989 |
| JP | 61003539 | 2/1986 |
| JP | 61056045 | 3/1986 |
| JP | 62259543 | 11/1987 |
| JP | 2207743 | 8/1990 |
| JP | 3240442 | 10/1991 |
| JP | 6319458 | 11/1994 |
| WO | WO9515699 | 6/1995 |
| WO | WO9521536 | 8/1995 |
| WO | WO00/64269 | 11/2000 |

* cited by examiner

CONFECTIONERY AERATION SYSTEM

This application is a Continuation-in-Part of PCT/GB00/04008 filed Oct. 19, 2000.

This invention relates to confectionery aeration systems for producing an aerated confectionery material, particularly, but not exclusively, aerated chocolate.

The invention is applicable to the aeration of any material with similar flow characteristics to liquid chocolate, for example pastes, batters, slurries and any similar flowable material where aeration is required.

Where the context admits, the term 'aerated' will be used herein to cover bubbles containing gases other than air, such as bubbles of nitrogen.

It is known to inject air into the chocolate flow into a depositor hopper but this provides difficulty of control, and the degree of aeration is limited.

We are aware of European patent specification no. EP 0724836A2 which discloses apparatus for aerating chocolate, and which comprises an inclined mixing drum provided with a rotating paddle structure for mixing chocolate in the drum with pressurised gas fed to the drum. The aerated chocolate is fed from the drum to a pouring head. Any excess chocolate that is not utilised by the pouring head is recirculated through a throttle valve and a de-aerator, for mixing with fresh chocolate supplied to the drum. Thus, all recirculated aerated chocolate is subject to de-aeration.

According to one aspect of the invention there is provided a system comprising a confectionery material re-circulation circuit, the circuit comprising an aerator and a confectionery vessel, the confectionery material re-circulation circuit being arranged such that a re-circulation outlet of the vessel is connected to an inlet of the vessel, the re-circulation circuit being without any de-aeration means for producing any substantial de-aeration material in the flow path between the re-circulation outlet and the aerator, the aerator being arranged in the re-circulation circuit to further aerate aerated confectionery material flowing from the re-circulation outlet of the vessel to the vessel inlet, the vessel inlet being provided with a back-pressure producing device arranged so as to maintain a super-atmospheric pressure in the confectionery material in that part of the re-circulation circuit between the aerator and the vessel inlet, the circuit being provided with a supply connection for feeding fresh confectionery material into the re-circulation circuit, and a supply of aerated confectionery material for feeding to a confectionery producing process being taken from at least one of a first feed outlet located in a lower part of the vessel and a second feed outlet which receives material which is conveyed from the aerator to the inlet of the vessel.

The fresh confectionery material may contain some excess of the aerated material which preferably has been de-aerated prior to inclusion in the fresh supply.

The inventive system is capable of providing the confectionery material supplied to the confectionery producing process with a relatively high degree of aeration.

The inventive system is particularly suitable, but not exclusively, for the production of deposited confectionery material containing microscopic bubbles. The vessel may then be constituted by a depositor hopper, the feed outlet of which feeds a plurality of depositor outlets.

The vessel may, however, be used in conjunction with an existing supply hopper, particularly where the invention is being applied to an existing confectionery process installation the supply hopper of which cannot easily be modified. The vessel feed outlet may then be used to supply aerated material to the supply hopper.

Thus, said vessel provides a reservoir of aerated material which is used to replenish the supply hopper.

Preferably the rate of injection of gas into the confectionery material by the aerator is controlled in response to a measure of the density of confectionery material in the supply to the vessel inlet, and preferably a density measuring means is positioned just prior to the back-pressure producing means.

Preferably a pump is provided in the re-circulation circuit between the re-circulation outlet of the vessel and the aerator for pumping material around the re-circulation circuit against the flow resistance of the aerator and the back-pressure created by the back-pressure producing means.

The supply connection is preferably located on the inlet side of the pump.

The supply of fresh confectionery material to the supply connection is preferably controlled by the output of a level sensing means responsive to the level of confectionery material in the vessel.

According to a second aspect of the invention we provide a process for aerating confectionery material for supply to a confectionery producing process comprising maintaining a reservoir of aerated confectionery material in a confectionery vessel, and recirculating a portion of the material in the reservoir, without use of a de-aerator, through an aerator, and through a back-pressure producing means associated with an inlet to the vessel, the back-pressure producing means being so arranged as to maintain a super-atmospheric pressure in the confectionery material in that part of the re-circulation circuit between the aerator and the vessel inlet.

The invention will now be further described, by way of example only, with reference to the accompanying drawings in which.

A depositor hopper 1 is of well-known construction, apart from the inlet and outlet connections thereto, the base 2 of the hopper being formed with a plurality of hopper outlets 3 controlled by respective plungers, not shown, which feed respective depositor heads in known manner.

Figure 1:
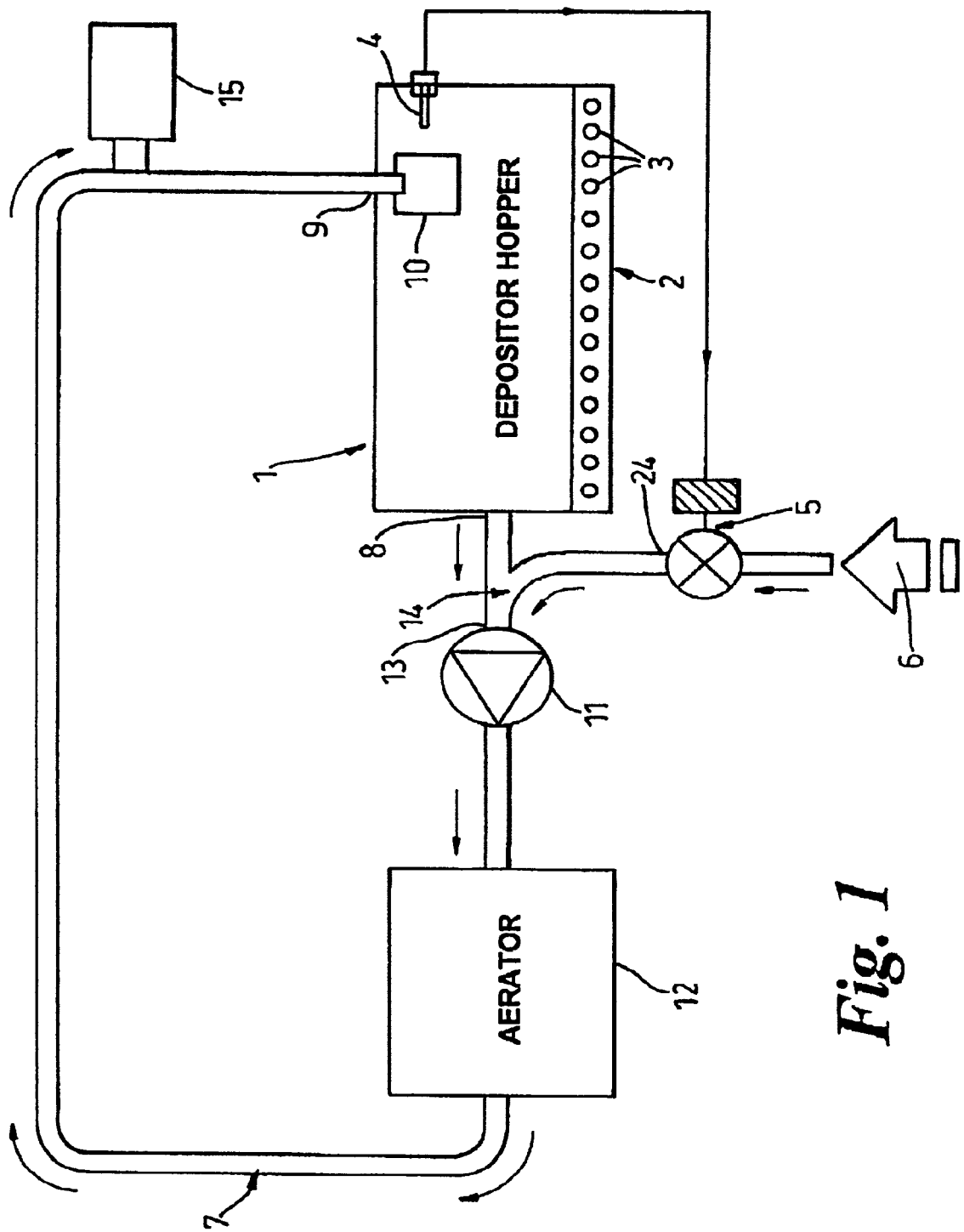
FIG. 1 is a flow diagram of a confectionery depositor system incorporating an aeration system in accordance with the invention.

With reference to FIG. 1, in use, the depositor hopper 1 contains chocolate, or some other confectionery material, the level of the upper surface of the chocolate being sensed by a level probe 4. The signal from level probe 4 is used to control a control means such as a solenoid-operated supply valve 5 which controls the supply 6 of fresh chocolate from a temperer, not shown, into a re-circulation circuit 7.

The re-circulation circuit 7 extends from a re-circulation outlet 8 of the hopper 1 to a hopper inlet 9, the inlet 9 leading into the upper part of the hopper 1, whereas the re-circulation outlet 8 leaves from the mid-height of the hopper 1. The hopper inlet 9 is provided with a back-pressure producing means such as a restrictor valve 10, which is conveniently located within the upper part of hopper 1.

The re-circulation circuit 7 incorporates a pump 11 and an aerator 12. The pump inlet 13 is connected by a Y-connection 14 freely with the re-circulation outlet 8 and with the outlet 24 of solenoid valve 5, the outlet 24 being located so as to feed fresh material into the circuit at a point upstream of the aerator 12. Pump 11 operates continuously both to recirculate chocolate from the hopper 1 around the circuit 7 so that the chocolate is recirculated through aerator 7, and to pump fresh material to the hopper 1 from supply 6 under the control of valve 5.

The aerator 12 is preferably an aerating head of the kind in which after injection of gas into the confectionery material, the confectionery material is subjected to shearing forces in order to reduce bubble size.

The pressure of the chocolate in the re-circulation circuit between the aerator and the inlet 9 is preferably arranged to be substantially in the range 2 to 10 atmospheres, above atmospheric pressure, and preferably substantially in the range 3 to 6 atmospheres above atmospheric pressure.

Aerator 12 is fed with nitrogen or other suitable gas and the amount of gas injected into the chocolate by aerator 12 is controlled in response to the output of a density meter 15 which measures the density of the aerated chocolate just prior to the chocolate being fed to the hopper inlet 9.

The device 15 is typically of the vibrating tube type, and for example suitable units are those available from PAAR Scientific Limited, 594 Kingston Road, Raynes Park, London SW20 8DN under designation DPR Density meter.

The aerator 12 will inject gas bubbles into fresh chocolate being fed from supply 6 and will also provide further aeration of chocolate being recirculated from the hopper 1, thereby maintaining aeration of the chocolate in hopper 1 which supplies the hopper outlets 3.

The provision of a re-circulation circuit 7 containing aerator 12 enables a relatively high degree of aeration to be maintained throughout the hopper 1 and thus in the chocolate delivered by hopper outlets 3, and also progressively reduces the size of the bubbles in the recirculated chocolate, thereby improving the appearance of the deposited material.

The back-pressure-producing valve can be any suitable form of flow-restrictor and may be controllable to adjust the back-pressure. Such a valve may comprise an orifice disc or a modulating valve.

Figure 2:
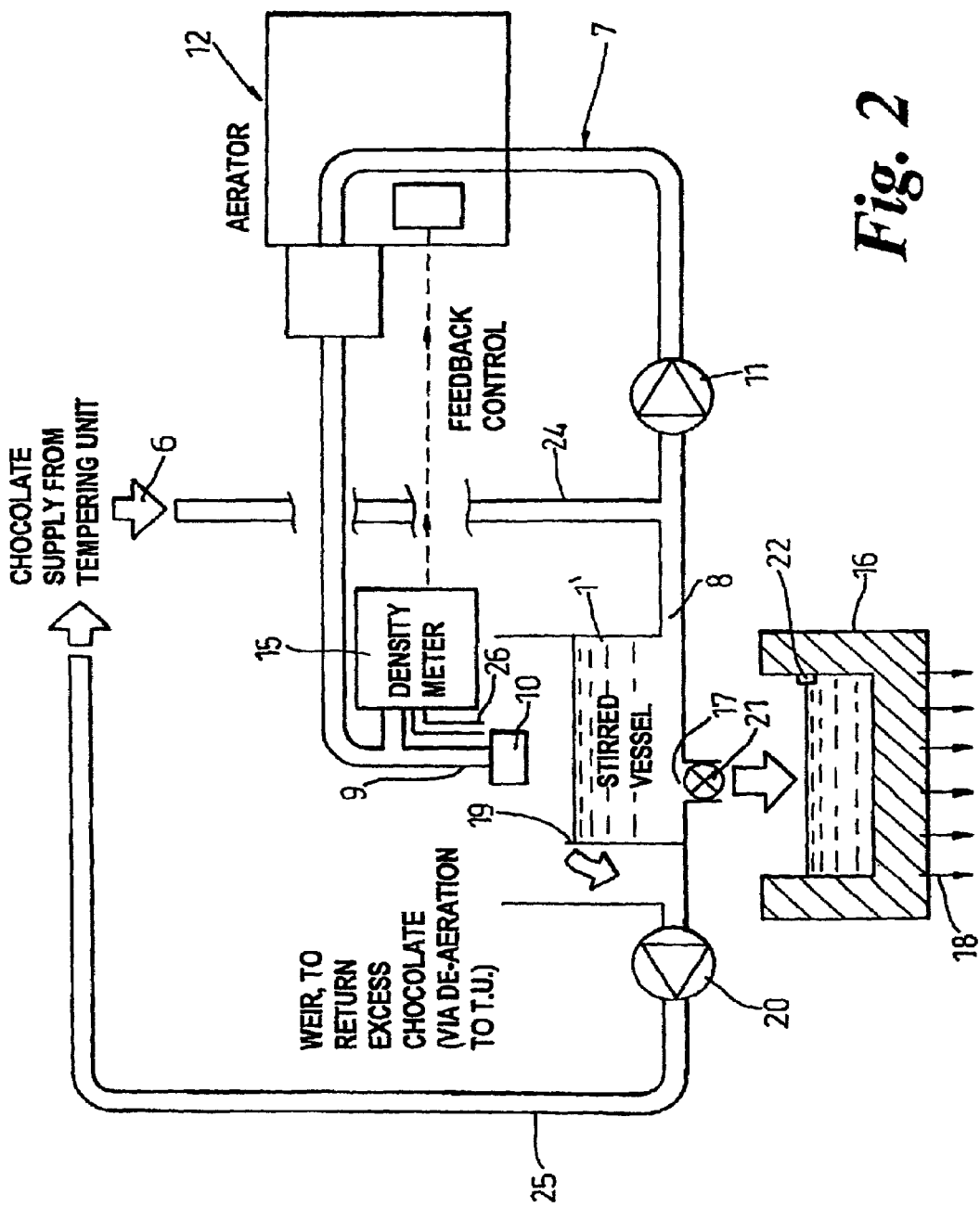
FIG. 2 is a flow diagram of a modified aeration system in accordance with the invention and suitable for supplying aerated material to the supply hopper of a confectionery process.

In FIG. 2 parts of the system corresponding to those of the system of FIG. 1 have been given corresponding reference numerals.

FIG. 2 shows an application of the invention to feed aerated chocolate to an existing hopper 16 of a chocolate handling machine, such as moulding or dipping machines. It may not be practical or economically feasible to replace the existing hopper 16 of the chocolate handling machine with a hopper of the form of the hopper 1 of FIG. 1, but a supplementary vessel 1' can usually be accommodated, the re-circulation circuit 7 connecting with the vessel 1' in order to maintain a reservoir of aerated chocolate which is used to feed the hopper 16 by way of vessel outlet 17. Vessel 1' is preferably stirred.

Hopper 16 is provided in its base with one or more hopper outlets 18 which can be used, for example, to supply flowable aerated material to a plurality of depositor outlets, or to a dipping machine of the type used in ice cream manufacture.

Any suitable form of level control may be used to maintain the aerated chocolate in vessel 1' at a desired level, and a weir 19 is shown in FIG. 2 for that purpose, a pump 20 being provided to return excess chocolate from weir 9 via a return pipe 25 to the tempering unit, not shown by way of a de-aerator, not shown.

A valve 21 controls the supply of aerated chocolate from the outlet of vessel 1' to the hopper 16, the valve 21 being controlled by a level sensor 22 in hopper 16.

As shown in FIG. 2 a back-pressure producing means 10 has been provided on the main hopper inlet 9. A separate back-pressure producing means may be required on the output 26 of the density meter, depending upon the flow resistance associated with the density meter itself.

Figure 3:
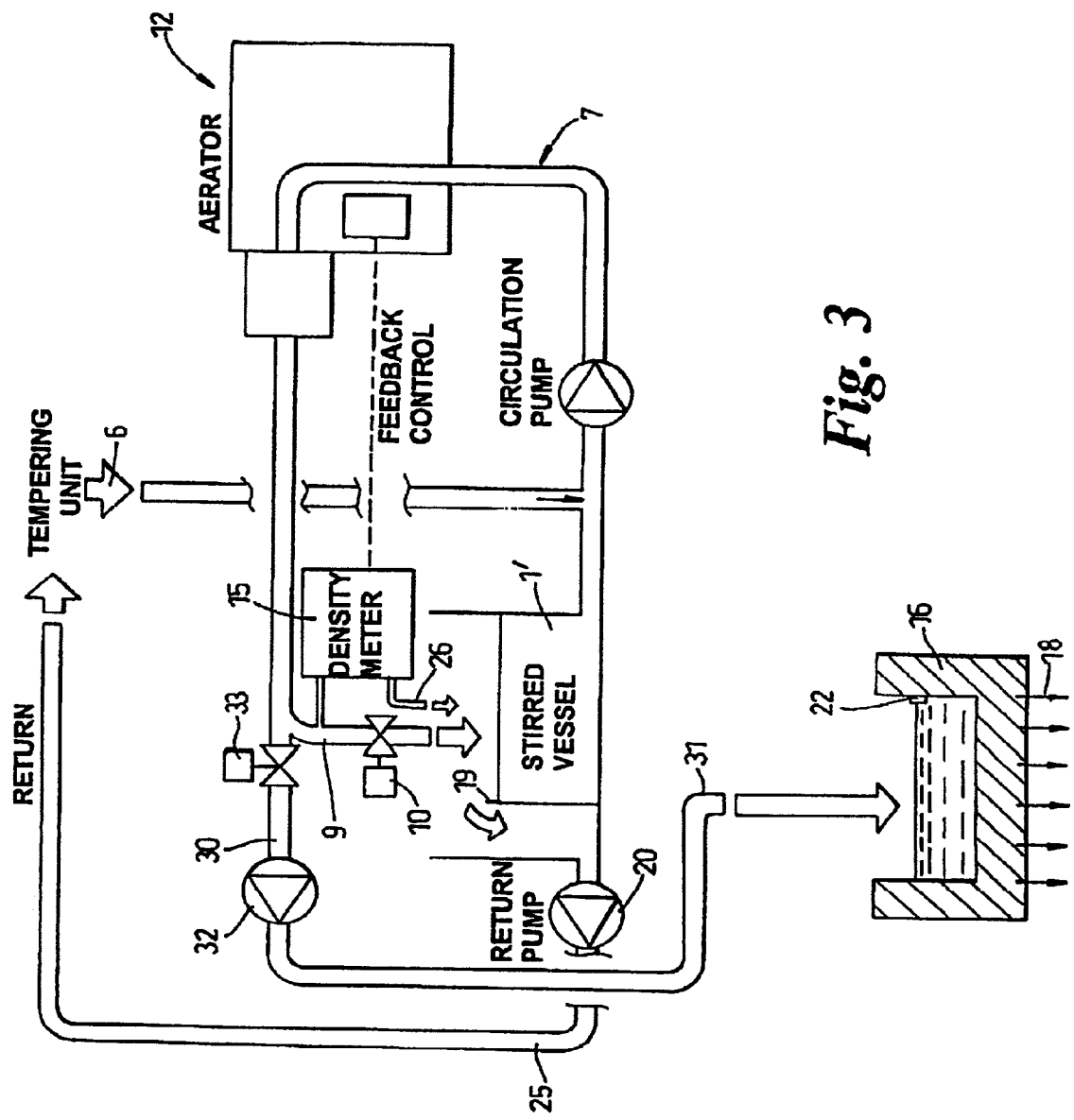
FIG. 3 is a flow diagram of a further modified aeration system in accordance with the invention and suitable for supplying aerated material to the supply hopper of a confectionery process.

FIG. 3 shows a third embodiment of the invention which is similar to that shown in FIG. 2, and like features are shown with the same reference numerals. Whereas in the embodiment of FIG. 2 the supply to process issues from the vessel 1', in FIG. 3 the supply to process issues from a feed outlet 31 which is located at a distal end of a conduit 30. The conduit 30 is located between the aerator 12 and the outlet 9, and thus receives confectionery material which has passed through the aerator 12 and which is conveyed to said outlet 9.

The conduit 30 is provided with a back-pressure device 33 and a pump 32. The pump 32 serves to isolate material which is downstream of the pump 32 from pressure fluctuations in the re-circulation circuit 7.

The conduit 30 may be adapted to feed, in addition to the supply to process, a conduit (not shown) which is connected with the re-circulation circuit 7 and/or an intermediate buffer vessel (not shown) which supplies material to the vessel 16.

In an alternative embodiment to that shown in FIG. 3, the supply of chocolate 6 from the tempering unit is fed directly into the vessel 1'.

It will be appreciated that although specific reference has been made to a confectionery producing process which employs a depositor, the present invention finds utility in many other confectionery producing processes.

What is claimed is:

1. A confectionery aeration system comprising a confectionery material re-circulation circuit, the circuit comprising an aerator and a confectionery vessel, the confectionery material re-circulation circuit being arranged such that a re-circulation outlet of the vessel is connected to an inlet of the vessel, the re-circulation circuit being without any de-aeration means for producing any substantial de-aeration material in the flow path between the re-circulation outlet and the aerator, the aerator being arranged in the re-circulation circuit to further aerate aerated confectionery material flowing from the re-circulation outlet of the vessel to the vessel inlet, the vessel inlet being provided with a back-pressure producing device arranged so as to maintain a super-atmospheric pressure in the confectionery material in that part of the re-circulation circuit between the aerator and the vessel inlet, the circuit being provided with a supply connection for feeding fresh confectionery material into the recirculation circuit, and a supply of aerated confectionery material for feeding to a confectionery producing process being taken from at least one of a first feed outlet located in a lower part of the vessel and a second feed outlet which receives material which is conveyed from the aerator to the inlet of the vessel.

2. A system as claimed in claim 1 comprising a return circuit for returning excess aerated material to the fresh supply, the return circuit comprising a de-aeration means.

3. A system as claimed in claim 1, in which said vessel is constituted by a depositor hopper, said first feed outlet of which feeds a plurality of depositor outlets.

4. A system as claimed in claim 1, in which the supply of fresh confectionery material to the supply connection is controlled by the output of a level sensing means responsive to the level of confectionery material in the vessel.

5. A system as claimed in claim 1 applied to a pre-existing confectionery process installation which comprises a supply hopper, said first feed outlet of the confectionery vessel being arranged to lead into the supply hopper.

6. A system as claimed in claim 1, in which the rate of injection of gas into the confectionery material by the aerator is controlled in response to a measure of the density of confectionery material in the supply to the vessel inlet.

7. A system as claimed in claim 6, in which the density measuring means is positioned just prior to the back-pressure producing device.

8. A system as claimed in claim 1 comprising a pump in the re-circulation circuit between the re-circulation outlet of the vessel and the aerator for pumping material around the re-circulation circuit against the flow resistance of the aerator and the back-pressure created by the back-pressure producing device.

9. A system as claimed in claim 8, in which the supply connection is located on the inlet side of the pump.

10. A system as claimed in claim 1 comprising a pump which is arranged to act on material in the second feed outlet.

* * * * *